Aug. 9, 1960 D. E. ROYER 2,948,263
PROPELLER TORQUE UNIT CONSTRUCTION
Filed May 19, 1958 2 Sheets-Sheet 1

INVENTOR.
Darrell E. Royer.
BY
D. C. Staley
His Attorney.

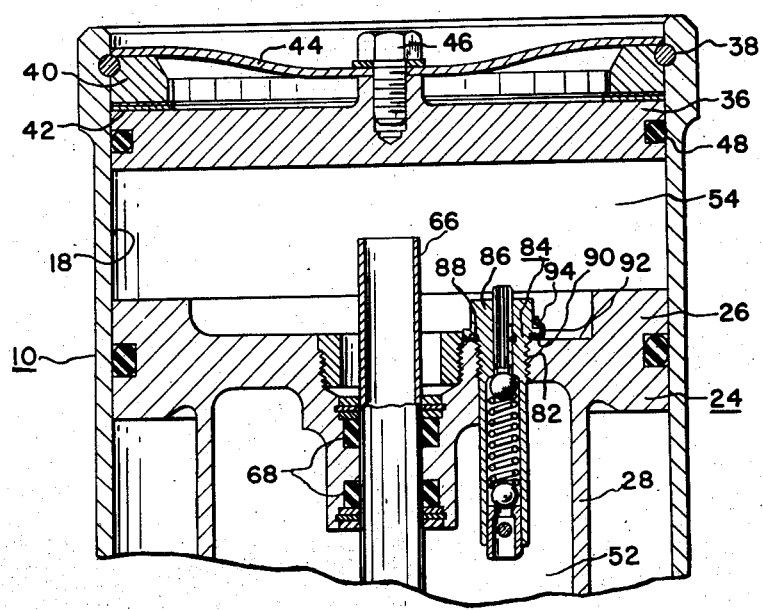
Fig. 2
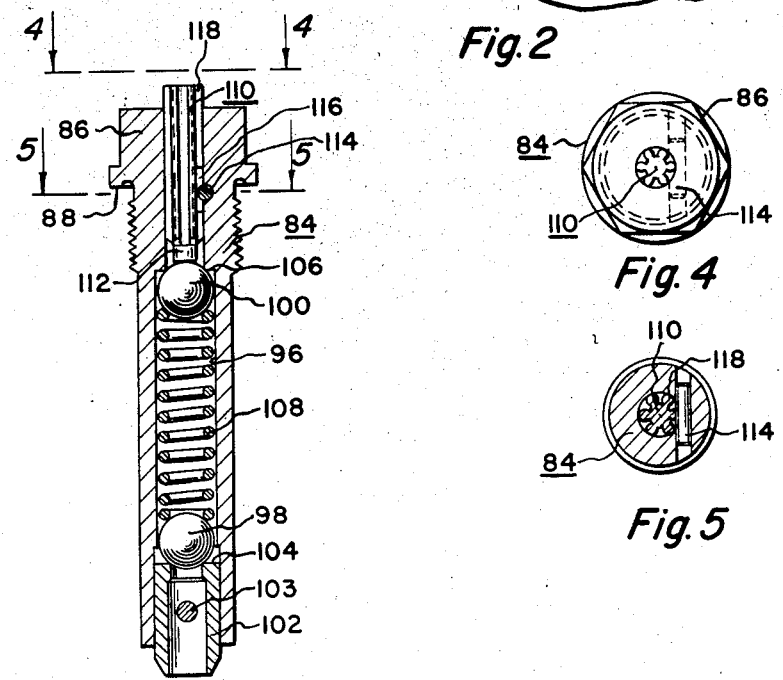
Fig. 3
Fig. 4
Fig. 5
INVENTOR.
Darrell E. Royer.
BY
D. C. Staley
His Attorney.

United States Patent Office 2,948,263
Patented Aug. 9, 1960

2,948,263

PROPELLER TORQUE UNIT CONSTRUCTION

Darrell E. Royer, Vandalia, Ohio, assignor to General Motors Corporation, Detroit, Mich., a corporation of Delaware Filed May 19, 1958, Ser. No. 736,324

10 Claims. (Cl. 121—38)

This invention pertains to fluid pressure operated motors, and particularly to servo motors for adjusting the pitch position of propeller blades.

Heretofore, variable pitch propellers have been built wherein each propeller blade is rotated about its longitudinal axis by an independent servo motor. The servo motor may include a rotatable cylinder drivingly connected with the blade and a reciprocable piston disposed therein having helical spline connections with both the cylinder and a fixed reaction member. A torque unit of this type is disclosed in Hirsch Patent #2,734,587. When torque units of this type are embodied in a propeller assembly such as shown in copending application Serial No. 572,348 Bodem et al., filed March 1956, having a hydraulic control system of the type shown in copending application Serial No. 627,619 Brandes et al., filed December 11, 1956, both assigned to the assignee of the present invention, it has been observed that the increase pitch chambers may be subjected to excessive pressures due to propeller windmilling. Propeller windmilling will occur if the propeller blades are not completely feathered even though the torque unit pistons engage their mechanical stops. The present invention relates to a torque unit construction including relief valve means for limiting the maximum pressure in the increase pitch chamber of the torque unit when the torque unit piston is at one end of its stroke, namely, the feathered position. Accordingly, among my objects are the provision of a servo motor including relief valve means for limiting the maximum pressure in one of the chambers when the piston is at one of its stroke ends; the further provision of pressure relief valve means for a servo motor which automatically open if the pressure in one chamber exceeds a predetermined potential when the piston is at one end of its stroke and automatically close to prevent communication between the chambers when the other cylinder chamber is subjected to pressure; and the still further provision of a torque unit including a piston carried pressure relief valve assembly comprising a pair of oppositely acting one-way check valves which are normally closed, one of the check valves being mechanically unseated when the torque unit piston is at one of its stroke ends.

The aforementioned and other objects are accomplished in the present invention by attaching the relief valve assembly to the piston head and utilizing a reciprocable actuator for unseating one of the valves when the piston is at one of its stroke ends. Specifically, the servo motor includes a cylinder which is rotatably supported in a propeller hub and disposed within the hollow root portion of a propeller blade. The cylinder may be drivingly connected with the propeller blade by any suitable means, such as an indexing ring. A reciprocable piston having an axially extending skirt is disposed within the cylinder. The piston skirt has internal and external helical splines, the external helical splines mating with internal helical splines formed on the cylinder, and the interanl helical splines on the skirt mating with external helical splines formed on a fixed reaction member attached to the propeller hub. Accordingly, reciprocation of the piston will be accompanied by angular movement thereof so as to impart rotary movement to the cylinder.

The cylinder includes an adjustable cylinder head constituting a mechanical stop limiting movement of the piston in the other direction is limited by engagement between the piston and an internal shoulder of the cylinder. The torque unit cylinder is connected to the propeller blade in such a manner that the propeller blade will be in a feathered position when the torque unit piston engages the cylinder head. In order to limit the maximum pressure in the increase pitch chamber, the cylinder piston head carries a relief valve assembly comprising a valve body having a pair of spaced valve seats and a pair of ball valves engageable with the valve seats under the urge of a spring disposed therebetween. A reciprocable fluted pin is carried by the valve body and is engageable with the cylinder head when the piston is moved into engagement therewith. This pin unseats one of the ball valves whereupon the other ball valve can be unseated by fluid under pressure so as to connect the chambers on opposite sides of the piston if the pressure in the increase pitch chamber increases above a predetermined potential.

However, when the torque unit piston is not in engagement with the cylinder head, the pressure relief valve assembly will prevent communication between the torque unit chambers since one check valve will always be urged towards its closed position by the higher of the pressures in the two chambers. In addition, when the piston is in engagement with the cylinder head, it can be moved in the opposite direction since the application of pressure to the other chamber will act on one of the ball valves to close the passage between the two chambers.

Further objects and advantages of the present invention will be apparent from the following description, reference being had to the accompanying drawings, wherein a preferred embodiment of the present invention is clearly shown.

In the drawings:

Figure 2 is a fragmentary sectional view of the torque unit depicting the piston in an intermediate position.

Figure 3 is a sectional view of the pressure relief valve assembly.

Figure 4 is a view in elevation taken along line 4—4 of Figure 3.

Figure 5 is a sectional view taken along line 5—5 of Figure 3.

Figure 1:
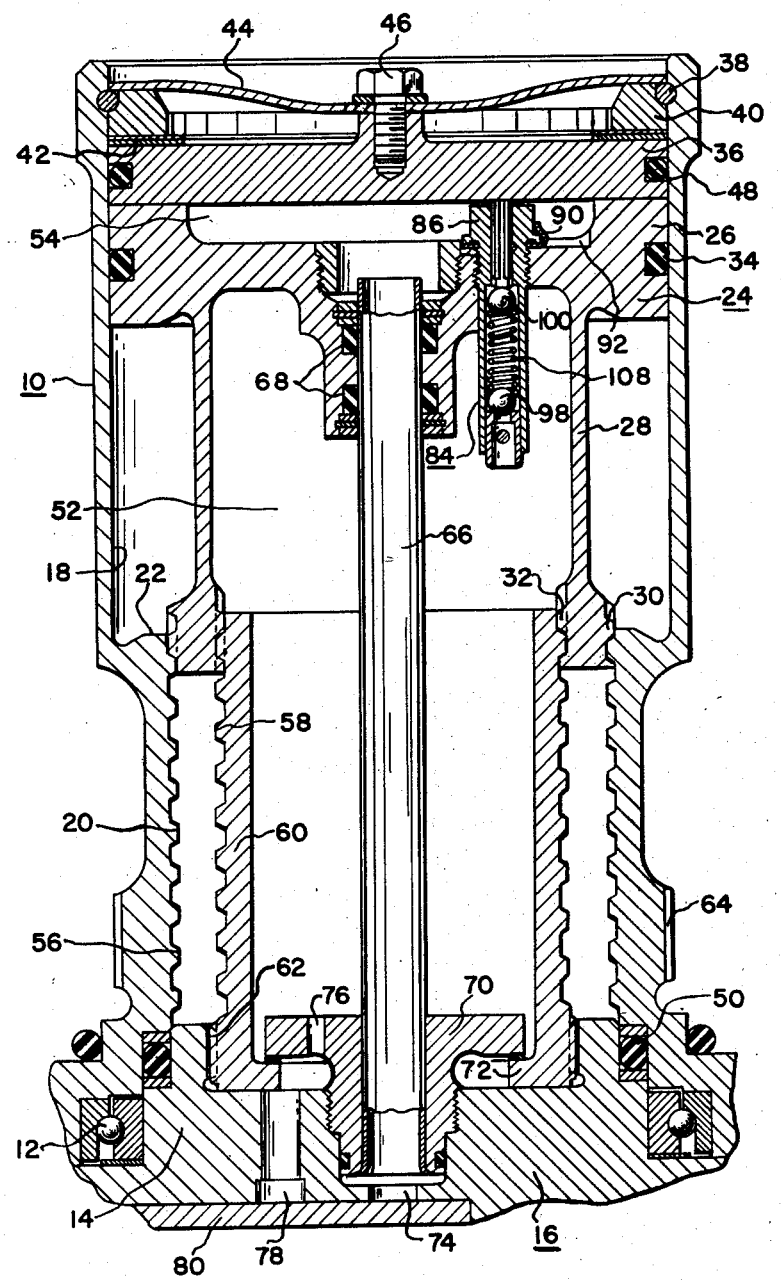
Figure 1 is a longitudinal sectional view of a torque unit constructed according to this invention, with the piston in the feathered pitch position.

As alluded to hereinbefore, in propeller assemblies of the type disclosed in the aforementioned copending applications, the increase pitch chambers of the torque units are connected directly with the output of the propeller-driven pumps during feathering position. Accordingly, the increase pitch chambers are subjected to maximum unregulated ouput pressure of the pumps, and since the feathered position of the propeller blades is determined by engagement of the torque unit pistons with their respective cylinder heads, if the propeller should windmill, due to the fact that the propeller blades are not completely feathered, the pressure in the increase pitch chambers may rise to a potential sufficient to rupture the torque unit cylinder. However, with the torque unit construction of this invention, the maximum pressure potential which can exist in the increase pitch chambers of the torque units when the torque unit pistons are in their feathered positions is limited by pressure responsive relief valve means to a predetermined pressure, for instance 1000 p.s.i., so as to preclude damage to the torque units and pressure supplying conduits.

With particular reference to Figure 1, a torque unit is shown including a cylinder 10 which is rotatably mounted by ball bearing means 12 on a socket boss 14 of a propeller hub 16. The cylinder 10 has a stepped bore therethrough including a larger diameter portion 18 and a smaller diameter portion 20. An internal shoulder 22 is formed by the smaller diameter portion and a reciprocable double acting piston 24 is disposed within the larger diameter cylinder portion 18. The piston 24 includes a head portion 26 and a depending annular skirt 28 having external helical spline teeth 30 and internal helical spline teeth 32. The piston head 26 carries suitable sealing means 34 which engage the side walls of the larger diameter portion 18. The open end of the cylinder 10 is closed by an adjustable cylinder head 36 supported in the cylinder by a snap ring 38. A spacer 40 is seated against the snap ring and a plurality of shims 42, disposed between the spacer 40 and the outer edge of the cylinder head 36, are utilized to determine the position of the cylinder head within the cylinder. A spring 44 engages the snap ring 38 and is held in place with respect to the cylinder head 36 by a screw 46.

The cylinder head 36 carries a high pressure seal 48 which prevents leakage at the outboard end of the cylinder. A seal assembly 50 disposed between the cylinder 10 and the hub boss 14 prevents leakage at the inboard end of the cylinder. The piston 24 divides the cylinder 10 into an increase pitch chamber 52 and a decrease pitch chamber 54. Outboard movement of the piston 24 is limited by engagement between the piston head 26 and the cylinder head 36. Inboard movement of the piston 24 is limited by engagement between the piston head 26 and the internal shoulder 22 of the cylinder.

The smaller diameter portion 20 of the cylinder is formed with internal helical spline teeth 56 which mate with the external helical spline teeth 30 formed on the skirt 28. The internal helical spline teeth 32 on the skirt 28 mate with external spline teeth 58 formed on an annular member 60 which has a straight spline connection at 62 with the hub boss 14. Accordingly, the annular member 60 constitutes a fixed reaction member such that linear movement of the piston 24 is accompanied by angular movement thereof due to the mating helical splines 32 and 58, and this angular movement of the piston 24 is increased by the mating helical splines 30 and 56 so as to rotate the cylinder 10. The cylinder 10 is formed with a straight splined portion 64 by which it can be connected to a propeller blade, not shown, through an indexing ring, not shown.

The decrease pitch chamber 54 is always in communication with a fixed transfer tube 66 disposed within the torque unit cylinder 10 and extending through and slidably engaged by the piston head 26. The piston head 26 carries a pair of spaced seal assemblies 68 which prevent flow between the chambers 52 and 54 around the outside of the transfer tube 66. The transfer tube 66 extends through a screw device 70, to which it is suitably attached, having threaded engagement with the hub boss 14, the screw device 70 engaging a flange 72 of the fixed reaction member 60 so as to maintain the fixed reaction member 60 in engagement with the hub boss 14. The transfer tube 66 communicates with an annular hub passage 74 through which fluid under pressure may be supplied to and drained from the decrease pitch chamber 54. The screw device 70 includes a plurality of openings 76 which communicate with an annular groove 78 in the hub through which fluid under pressure may be supplied or exhausted from increase pitch chamber 52. The fluid supplied to the increase pitch chamber 52 acts on the entire underside of the piston head 24 since it can flow between the mating helical spline connections 58, 32, 30 and 56. The annular grooves 74 and 78 in the hub 16 are closed by a sleeve 80 which is suitably attached to the hub 16, such as by brazing.

The propeller blade, not shown, to which a torque unit cylinder is drivingly connected, is movable between a maximum, or feathered, position and a minimum, or negative, pitch position. The maximum pitch position of the propeller blades is determined by engagement of the piston head 26 with the cylinder head 36. The minimum pitch position of the propeller blade is determined by engagement of the cylinder head 26 with the shoulder 22.

With particular reference to Figures 2 through 5, the piston head 26 is formed with a threaded opening 82 which receives a tubular member 84 comprising a valve body. The tubular member 84 is formed with an enlarged hexagonal portion 86 and an annular shoulder 88 at the bottom thereof as shown in Figures 2 and 4. A locking device 90 is disposed between the shoulder 88 and a recessed portion 92 of the piston head 26, the locking device 90 having a tang 94 engageable with one of the flats on the hexagonal portion 86 for locking the tubular member 84 in position. The upper surface of the hexagonal portion 86 is disposed beneath the rim of the piston head 26 as clearly shown in Figures 1 and 2.

The tubular member 84 has a stepped bore 96 therethrough within which a pair of one-way ball type check valves 98 and 100 are disposed. A hollow plug 102 is disposed within the lower end of the bore 96 and connected to the tubular member 84, by a cross pin 103. The tubular member 102 includes a valve seat 104 for the ball valve 98, and the internal shoulder 106 in the stepped bore 96 constitutes a seat for ball valve 100. A coiled compression spring 108 is disposed between the ball valves 98 and 100 and normally urges the ball valves into engagement with their respective valve seats.

A fluted pin 110 is mounted for reciprocable movement in the smaller diameter portions of the through bore 96. The pin 110 includes a head portion 112 engageable with the ball valve 100. Reciprocation of the pin 110 relative to the tubular member 84 is limited by a cross pin 114 which extends through a cutout portion 116 in one of the flutes 118 on the pin 110.

When the piston 24 is not in engagement with the cylinder head 36, as depicted in Figure 2, either ball valve 98 or ball valve 100 prevents communication between the chambers 52 and 54. Thus, the chambers 52 and 54 can be subjected to maximum regulated output pressure of the propeller driven pumps which may be on the order of 3000 p.s.i., so as to effect movement of the piston 24 in either direction. When the chamber 52 is connected to pressure through groove 78 and opening 76, and the chamber 54 is connected to drain through the transfer tube 66 and the annular groove 74, the pressure in chamber 52 may unseat ball valve 98 by compressing the spring 108. However, this pressure will urge the ball valve 100 into engagement with its seat 106 whereby the ball valve 100 will prevent communication between the chambers 52 and 54. On the other hand, when the chamber 54 is subjected to pressure and chamber 52 is subjected to drain, the pressure in chamber 54 can unseat ball valve 100, but this pressure will urge the ball valve 98 into engagement with its seat 104.

However, when the piston 24 is moved to its maximum, or feathered pitch position as shown in Figure 1, the pin 118 engages the cylinder head 36 and moves downwardly relative to the valve body 84 so as to unseat ball valve 100. Under these conditions, if the propeller is not completely feathered, and consequently should windmill, the ball valve 98 will act as a relief valve to limit the maximum pressure in the increase pitch chamber 52. The spring 108 may be calibrated to permit the unseating of ball valve 98 if the pressure in the increase pitch chamber 52 should exceed 1000 p.s.i. Accordingly, if the pressure in the increase pitch chamber 52 should exceed 1000 p.s.i. the increase pitch chamber will be connected to the decrease pitch chamber 54, which is connected to drain, through the hollow plug 102, the through bore 96 and the space between the flutes 118 on the pin 110.

However, if it is desired to unfeather the propeller, by applying fluid under pressure to the decrease pitch chamber 54 while the increase pitch chamber 52 is connected to drain, communication between the chambers 54 and 52 will be blocked by the ball valve 98. This is true, since as soon as the chamber 54 is subjected to pressure and the chamber 52 is connected to drain, the pressure in chamber 54 will assist the spring 108 in maintaining the ball valve 98 seated.

From the foregoing it is readily apparent that the present invention provides means for preventing destruction or damage to pitch adjusting servo motors by incorporating pressure relief means for limiting the maximum pressure in the increase pitch chambers when the propeller blades are in the feathered position. However, when the propeller blades are not in the feathered position, the relief valve means preclude communication between the increase and decrease pitch chambers.

While the embodiment of the invention as herein disclosed constitutes a preferred form, it is to be understood that other forms might be adopted.

What is claimed is as follows:

1. A propeller pitch adjusting servo motor including, a cylinder having a cylinder head at one end, a double acting piston disposed within said cylinder and dividing said cylinder into an increase pitch chamber and a decrease pitch chamber, said piston being capable of fluid pressure actuation in both directions between maximum and minimum pitch positions, said maximum pitch position being constituted by engagement of said piston with said cylinder head, and pressure relief valve means carried by said piston for limiting the maximum pressure potential in said increase pitch chamber when said piston is in the maximum pitch position.

2. A propeller pitch adjusting servo motor including, a cylinder having a cylinder head at one end, a double acting piston disposed within said cylinder and dividing said cylinder into an increase pitch chamber and a decrease pitch chamber, said piston being capable of fluid pressure actuation in both directions between maximum and minimum pitch positions, said maximum pitch position being constituted by engagement of said piston with said cylinder head, pressure relief valve means carried by said piston, and mechanical means carried by said piston and engageable with said cylinder head when said piston is in the maximum pitch position for actuating said relief valve means whereby said relief valve means will limit the maximum pressure potential in said increase pitch chamber.

3. A propeller pitch adjusting servo motor including, a cylinder having a cylinder head on one end, a double acting piston disposed in said cylinder and dividing said cylinder into an increase pitch chamber and a decrease pitch chamber, said piston being capable of fluid pressure actuation in both directions between maximum and minimum pitch positions, said maximum pitch position being constituted by engagement of said piston with said cylinder head, a pair of oppositely acting one-way check valves carried by said piston, resilient means normally biasing said check valves to a closed position for preventing communication between said cylinder chambers, and a reciprocable member carried by said piston and engageable with one of said check valves for mechanically opening the same when the piston is in the maximum pitch position whereby said other check valve will act as a pressure relief valve and open when the pressure potential in said increase pitch chamber exceeds a predetermined value.

4. A propeller pitch adjusting servo motor including, a cylinder having a cylinder head at one end, a double acting piston disposed in said cylinder and dividing said cylinder into an increase pitch chamber and a decrease pitch chamber, said piston being capable of fluid pressure actuation in both directions between maximum and minimum pitch positions, said maximum pitch position being constituted by engagement of said piston with said cylinder head, a valve body carried by said piston having a pair of spaced valve seats, a pair of one-way check valves disposed within said valve body, resilient means disposed between said check valves for normally maintaining said check valves in engagement with their respective valve seats, and a reciprocable member carried by said valve body and engageable with the cylinder head when said piston is in the maximum pitch position for unseating one of said check valves whereby said other check valve will act as a pressure relief valve to limit the maximum pressure potential in said increase pitch chamber by interconnecting the two chambers when the pressure potential within said increase pitch chamber exceeds a predetermined value.

5. The servo motor set forth in claim 4 wherein said valve body comprises a tubular member having a stepped bore therethrough, wherein one of said valve seats comprises an internal shoulder in said bore, and wherein the other of said valve seats comprises a hollow plug secured in an end of said tubular member.

6. The servo motor set forth in claim 5 wherein said one-way check valves comprise a pair of balls, and wherein said resilient means comprises a coil spring, opposite ends of which engage said balls.

7. The servo motor set forth in claim 4 wherein said reciprocable member comprises a longitudinally fluted pin.

8. A propeller pitch adjusting servo motor including, a cylinder, a double acting piston disposed in said cylinder and movable by fluid under pressure between feathered and negative pitch positions, said feathered pitch position being constituted by engagement of said piston with one end of said cylinder, said piston dividing said cylinder into an increase pitch chamber and a decrease pitch chamber, means for supplying and exhausting fluid under pressure to and from said chambers to effect piston movement in either direction, and pressure relief valve means carried by said piston for limiting the maximum pressure potential in said increase pitch chamber by interconnecting said chambers when the piston is in the feathered position, said relief valve means automatically preventing communication between said chambers with the piston in the feathered position when said decrease pitch chamber is subjected to pressure.

9. A propeller pitch adjusting servo motor including, a cylinder, a double acting piston disposed in said cylinder and movable by fluid under pressure to a feathered pitch position, said feathered pitch position being constituted by engagement of said piston with one end of said cylinder, said piston dividing said cylinder into an increase pitch chamber and a decrease pitch chamber, means for supplying and exhausting fluid under pressure to and from said chambers to effect piston movement, and pressure relief valve means operable to interconnect said chambers in response to a predetermined pressure in said increase pitch chamber to limit the maximum pressure potential therein when the piston is in the feathered pitch position.

10. A propeller pitch adjusting servo motor including, a cylinder, a double acting piston disposed in said cylinder and movable by fluid under pressure to a feathered pitch position, said piston dividing said cylinder into an increase pitch chamber and a decrease pitch chamber, said feathered pitch position being constituted by engagement of said piston with one end of said cylinder, normally inoperative pressure relief valve means operable to interconnect said chambers, and means carried by said piston and engageable with said one end of the cylinder when the piston is in the feathered pitch position for actuating said relief valve means to limit the maximum pressure potential in said increase pitch chamber.

References Cited in the file of this patent

UNITED STATES PATENTS

| | | | |
|---|---|---|---|
| 561,747 | Worthington | June 9, | 1896 |
| 2,261,444 | Neubert | Nov. 4, | 1941 |
| 2,709,420 | Fullwood | May 31, | 1955 |
| 2,734,587 | Hirsch | Feb. 14, | 1956 |